(12) United States Patent
Gould et al.

(10) Patent No.: US 8,975,307 B2
(45) Date of Patent: Mar. 10, 2015

(54) PRINTING METHOD

(75) Inventors: Nigel Gould, Broadstairs (GB); Barry Michael McGregor, Godmanchester (GB)

(73) Assignee: Sericol Limited (GB)

( * ) Notice: Subject to any disclaimer, the term of this patent is extended or adjusted under 35 U.S.C. 154(b) by 257 days.

(21) Appl. No.: 13/380,417

(22) PCT Filed: Jun. 25, 2010

(86) PCT No.: PCT/GB2010/051053
§ 371 (c)(1),
(2), (4) Date: Mar. 8, 2012

(87) PCT Pub. No.: WO2010/150023
PCT Pub. Date: Dec. 29, 2010

(65) Prior Publication Data
US 2012/0157561 A1     Jun. 21, 2012

(30) Foreign Application Priority Data

Jun. 25, 2009    (GB) .................................. 0911015.6

(51) Int. Cl.
*C09D 11/101*     (2014.01)
*B41J 11/00*     (2006.01)
(Continued)

(52) U.S. Cl.
CPC ............. *C09D 11/101* (2013.01); *B41J 11/002* (2013.01); *B41M 5/0047* (2013.01); *B41M 5/0064* (2013.01); *B41M 7/0081* (2013.01)
USPC ........................................................ 522/16

(58) Field of Classification Search
CPC .... B41M 7/00; B41M 7/0081; B41M 11/002;
B41M 5/0047; B41M 5/0064; C09D 11/101;
C09D 11/102; C09D 11/106; C09D 11/107;
C09D 11/30; C09D 11/322
USPC ............. 347/20–21, 51, 84–85, 95, 101–103;
250/493.1, 494.1, 495.1, 504 R
See application file for complete search history.

(56) References Cited

U.S. PATENT DOCUMENTS

| 8,182,078 | B2 * | 5/2012 | Nakhmanovich et al. ..... 347/102 |
| 2006/0038868 | A1 * | 2/2006 | Otter .............................. 347/102 |
| 2006/0119686 | A1 | 6/2006 | Odell |

(Continued)

FOREIGN PATENT DOCUMENTS

| EP | 1728644 A1 | 12/2006 |
| EP | 2095966 A1 | 9/2009 |

(Continued)

OTHER PUBLICATIONS

International Search Report and Written Opinion issued in PCT/GB2010/051053 mailed Apr. 26, 2011.

(Continued)

*Primary Examiner* — Sanza McClendon
(74) *Attorney, Agent, or Firm* — Wood, Phillips. Katz, Clark & Mortimer

(57) ABSTRACT

The present invention provides a method comprising: applying a UV-curable ink to a substrate; partially curing the ink by exposing the ink to UV radiation from an LED source; and exposing the partially cured ink to UV radiation from a flash lamp. The flash lamp is a xenon or krypton flash lamp. An apparatus for performing the method and an ink adapted for use in the method are also provided.

33 Claims, 1 Drawing Sheet

(51) Int. Cl.
*B41M 7/00* (2006.01)
*B41M 5/00* (2006.01)

(56) References Cited

U.S. PATENT DOCUMENTS

2007/0139504 A1 6/2007 Siegel
2010/0154244 A1* 6/2010 Kuta et al. .................. 34/275

FOREIGN PATENT DOCUMENTS

| GB | 2311787 | A | 10/1997 |
| GB | 2314851 | A | 1/1998 |
| GB | 2399162 | A | 9/2004 |
| WO | 2004/002746 | A1 | 1/2004 |
| WO | 2005/068509 | A1 | 7/2005 |
| WO | 2006/068677 | A1 | 6/2006 |
| WO | 2006/090541 | A1 | 8/2006 |
| WO | 2008/093071 | A1 | 8/2008 |
| WO | 2008/114240 | A2 | 9/2008 |

OTHER PUBLICATIONS

International Preliminary Report on Patentability issued in PCT/GB2010/051053 mailed Nov. 16, 2011.
Search report from priority application No. GB0911015.6.

* cited by examiner

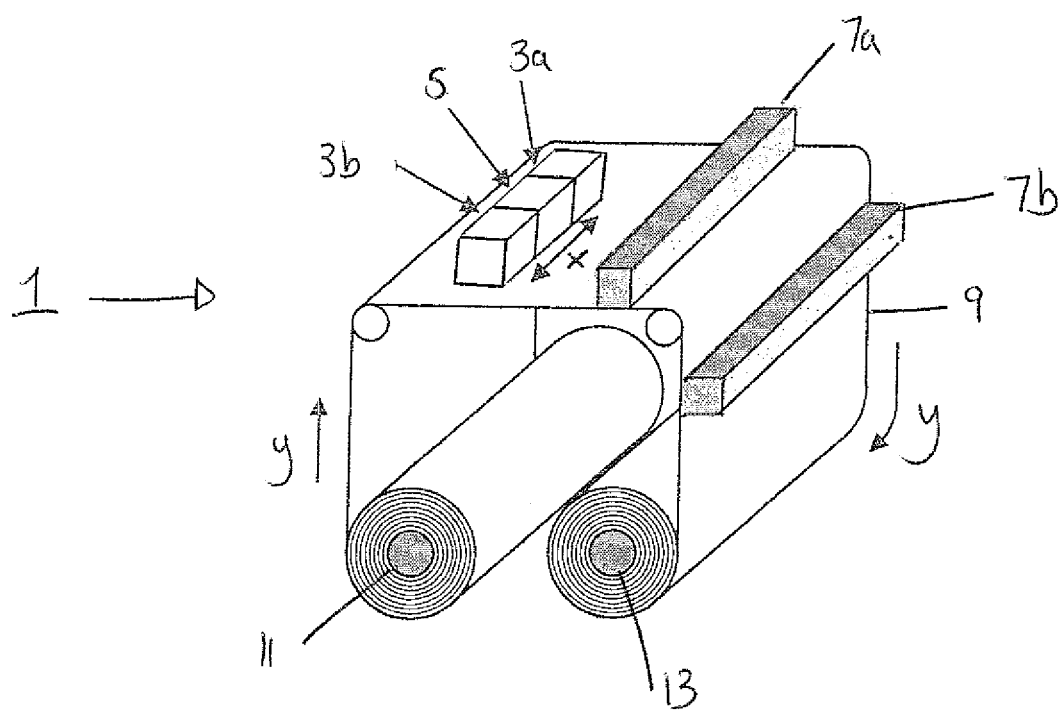

PRINTING METHOD

FIELD OF THE INVENTION

This invention relates to a method of printing ink and in particular to a method of printing UV-curable ink. The invention also relates to a printing apparatus and inks adapted for use in the method of the invention.

BACKGROUND OF THE INVENTION

In ink-jet printing, minute droplets of black or coloured ink are ejected in a controlled manner from one or more reservoirs or printing heads through narrow nozzles on to a substrate, which is moving relative to the reservoirs. The ejected ink forms an image on the substrate. For high-speed printing, the inks must flow rapidly from the printing heads, and to ensure that this happens they must have a low viscosity at the jetting stage. The ink viscosity is typically below 25 mPas at jetting temperature.

One type of ink contains unsaturated organic monomers or oligomers that polymerise by irradiation, commonly with UV light, in the presence of a photoinitiator. This type of ink has the advantage that it is not necessary to evaporate the liquid phase to dry the print; instead the print is exposed to radiation to cure or harden it, a process that is more rapid than evaporation of solvent at moderate temperatures.

There are two main technologies that can be used in a UV curing processes. The first method uses free-radical species to initiate the polymerisation of reactive monomers such as acrylate or methacrylate esters, and the second involves the generation of very strong acids to initiate the cationic polymerisation of reactive monomers such as epoxides, allyl ethers and vinyl ethers.

In UV printers the ink is cured shortly after printing by exposure to an intense UV light source. The ink, more particularly the photoinitiator provided in the ink, is generally tailored to respond to radiation having the particular wavelength(s) emitted by the UV source, principally to prevent curing in ambient light. The source should therefore have sufficient output intensity in this spectral region.

The most common UV light source used to cure printer ink is the mercury discharge lamp. These lamps operate by creating a plasma between two electrodes in a high pressure mercury gas contained in a quartz envelope. Although these lamps have several drawbacks in their operational characteristics, no other UV light source has yet managed to challenge their position in terms of UV output performance.

Since mercury is a liquid at room temperature, mercury discharge lamps must heat up, to typically 800° C., to establish a stable, high pressure mercury gas that gives a consistent output. Depending on the lamp size, the lamp must therefore be switched on for between 2-30 minutes before it can be used, which impacts on printing productivity.

The mercury spectrum has strong emission lines (peaks) at 254, 365 (I-line), 405 (H-line), 436 (G-line), 546, and 578 nm, though these can be influenced by the purposeful inclusion of impurities in the lamp. Many commercially available photoinitiators have been developed that respond to these peak emission wavelengths, making the development of UV curable inks that respond to mercury discharge lamps commercially effective. Unfortunately, the 254 nm emission is responsible for the efficient production of ozone in air, which can have consequences on human health if not properly managed. The mercury contained in the lamp also poses a threat to health if not properly managed throughout its full lifetime, which includes environmental disposal.

By adjusting the current flow through a mercury discharge lamp, the output power can be controlled, thereby affecting the flow characteristics of the ink on the receiving substrate. Exposing ink droplets to a high lamp power will cause the droplets to cure before they can spread and merge. This leads to a highly roughened surface with diffuse reflectance that gives a matt image effect, sometimes referred to as "satin". Conversely, low incident UV powers will allow the ink to flow slightly before curing is achieved, reducing the finished print surface roughness so that a "gloss" effect is achieved. A minimum current must be maintained to prevent the mercury discharge lamp plasma extinguishing. The output power range is therefore typically adjustable only between 25-100%. A proportional shutter mechanism is therefore required to control ink response to output powers below 25%, adding material cost to printers that can print both gloss and satin finish images.

The output power intensity of a mercury discharge lamp can fall rapidly with use, meaning that the lamps are considered a consumable item within printers, that have to be replaced approximately every 4-6 months. However, for stability of output to maintain the same degree of print finish (matt/satin/gloss), the intensity of the lamp must be routinely measured and the supplied power adjusted to compensate for reductions in lamp efficiency. These processes can be time-consuming and will have a detrimental impact on printer productivity.

LED (light emitting diode) UV light sources are an attractive alternative to mercury lamps. As well as their lack of toxicity, LEDs have several advantages over mercury discharge lamps. The output of the LED is immediate without a warm-up period and can be controlled from 0-100% by adjusting the device driving current. This relaxes the requirement for expensive drive electronics and shutters when used in printers. LEDs are also robust with lifetimes in excess of 5 years, which means that print finish reproducibility would be high without the necessity for repeated output power recalibration. LEDs also have a narrow spectral output and so the radiant energy produced is largely free from infrared, which has led LEDs to being heralded as a cool UV source.

Most graphical inks that have been developed for use with mercury discharge lamps have their peak response to light at about 365 nm. Unfortunately, as the LED emission wavelength is reduced below ~450 nm, the output efficiency falls rapidly. Any input power not converted to light is efficiently converted to heat. Furthermore, the UV output power of current LED sources is still relatively low when compared to mercury lamps. LED sources therefore have to be driven hard in order to achieve the UV outputs that are required to fully cure currently available inks. This results in heat being generated, which has to be removed to prevent the LEDs failure due to overheating. Cooling equipment adds considerably to the complexity and the cost of the printer design.

One solution is to run the LED curing units at lower output power. This, however, leads to poor curing at the surface of inks that cure by radical polymerisation, due to the presence of oxygen in the atmosphere adjacent to the ink surface. This effect can be overcome by blanketing the irradiated area with an inert gas such as nitrogen during the cure process but, again, this adds considerably to the complexity and cost of the printer. There is also a danger of asphyxiation if the nitrogen builds up in the vicinity of the print machine.

Since the LEDs are not made specifically for the UV-curing industry, they remain relatively expensive when compared to high volume production LEDs made for the lighting industry. For this reason, the LEDs currently comprise about 60% of the material costs of a UV-LED cure head. The high number of LEDs that would be needed for a static cure-bar to cover a 1.6 m width print makes this method of achieving full ink cure prohibitively expensive.

There is therefore a need for a UV printing method that overcomes the above disadvantages.

BRIEF SUMMARY OF THE INVENTION

Accordingly, the present invention provides a method comprising:
- applying a UV-curable ink to a substrate;
- partially curing the ink by exposing the ink to UV radiation from an LED source; and
- exposing the partially cured ink to UV radiation from a flash lamp.

The combination of a first, partial cure step using an LED source and a second curing step using a flash lamp (e.g. xenon or krypton) surprisingly allows control of the print image (i.e. matt, satin or gloss) while providing good adhesion to the substrate and good surface cure. Furthermore, the method does not require a nitrogen environment in order to achieve a good surface cure. The method of the present invention is also more reliable and has lower power consumption than methods that use mercury discharge lamps, for example.

Without wishing to be bound by theory, it is believed that exposure to the LED source causes partial curing of ink below the surface of the printed film, which causes the ink to "set" on the substrate. This step is also known as "pinning". The LED source produces radiation that is capable of penetrating into the ink. Thus, partial cure of the ink throughout the printed film can be achieved. Control of the print image can be achieved by varying the power of the UV radiation from the LED source in order to provide a matt, satin or gloss effect and/or to improve the colour gamut. This primary curing step therefore defines the image quality. However, the surface of the film remains tacky after partial curing, due to the inhibiting effect of oxygen in the atmosphere adjacent to the printed ink surface. A second curing step comprising exposure to UV radiation emitted from a flash lamp has been found to provide excellent surface cure. The high peak irradiance of the flash lamp overcomes the inhibiting effect of oxygen at the ink surface since it results in a high level of radical formation despite the short duration (i.e. low dose). In contrast, the LED has a lower peak irradiance but the exposure time is longer leading to a high dose which-permeates through the ink. The overall effect is a particularly good complementarity between the two radiation source leading to a combination of excellent surface and through cure.

LEDs emit UV radiation over a narrow range of wavelengths (for example, a 15 nm bandwidth) and the emission is identified by the wavelength which corresponds to the peak in the wavelength distribution, for example 395 nm. LEDs used according to the present invention preferably emit peak UV radiation between 250 and 450 nm, for example 365 nm, 395 nm, 400 nm or 405 nm.

The LED source comprises one or more LEDs. The LED source may comprise an array of LEDs within chip packages, which are themselves in arrays. Alternatively, a single LED may be provided in each chip package. The precise arrangement of LEDs can be varied. For example, the LEDs and/or the chip packages can be arranged in staggered rows in order to provide uniform exposure to the substrate.

UV dose is the total energy provided to a surface per unit area and is measured in $mJ/cm^2$. The UV dose provided to the ink during the partial cure step is preferably 10 to 300 $mJ/cm^2$, more preferably 50 to 250 $mJ/cm^2$ and most preferably 75 to 200 $mJ/cm^2$. These doses are lower than those required for full curing. The UV dose per unit area can be controlled by varying the radiant power of the LED source and/or by varying the length of time that the ink is exposed to the radiation. Preferably, the LED source emits at reduced power, for example, 90% or less, preferably 65% or less and most preferably 50% or less of the maximum power output. When the LED emits at reduced power, the cooling requirements are reduced, which means that the printer design is less complex.

One example of an LED source suitable for use in the present invention is the 4 $W/cm^2$ Phoseon RX StarFire Max 150 395 nm model. By spacing the source 6 mm from the material to be cured, and by exposing the sample material to the source at a speed of 15 meters per second, UV doses of approximately 50 $mJ/cm^2$ to approximately 300 $mJ/cm^2$ can be achieved by varying the radiant power output of the LED from 10 to 90% of the maximum power. The most preferred UV doses of 75 to 200 $mJ/cm^2$ can be achieved by varying the power of the LED output from approximately 15% to approximately 50%. The person skilled in the art would be capable of varying the UV dose provided by other UV LED sources in a corresponding way. The UV dose provided to the ink can be measured using a UV radiometer, such as the EIT Powermap model no. PWRDOB-H, supplied by Electronic Instrumentation & Technology, Inc.

The flash lamp is preferably a xenon or krypton flash lamp, although a xenon flash lamp is preferred. Xenon and krypton flash lamps are also commercially available. The ink that has been partially cured is exposed to UV radiation emitted from a xenon flash lamp in order to cure the surface of the ink. Flash lamps emit pulses of high intensity UV radiation. The total UV dose provided by a flash lamp can be controlled by varying the duration of the flash, the number of flashes, the flash frequency and/or the intensity.

The xenon flash lamp is positioned such that the ink is exposed to UV radiation from the xenon flash lamp after it has been partially cured by exposure to the LED source.

The degree of curing can be assessed by using the finger-nail scratch test. This is a well known test in the art. The film is printed and then partially or fully cured. The adherence of the ink is tested by ascertaining the level which can be removed by scratching and applying a value on a scale of 1 to 5. The values are determined as follows:
1=no cure, film completely wet
2=some cure, but film soft and smeary
3=good adhesion to substrate but ink surface wet
4=good adhesion to substrate but surface is tacky
5=ink film fully cured, good adhesion to substrate and ink surface tack free In the method of the present invention, the LED irradiation preferably provides a film having a value of 3 or 4 in the finger-nail scratch test.

Any method of applying a UV-curable ink onto a substrate can be used in the method of the present invention, and suitable methods and inks would be well-known to the person skilled in the art. For example, the ink may be applied by screen printing, flexography, lithographic printing or gravure printing. However, the method of the present invention is preferably a method of inkjet printing comprising applying an ink-jet ink using an ink-jet printer.

Ink-jet printers comprise a printhead that includes a series of nozzles through which ink is ejected onto a substrate. The printhead traverses the print width (moves back and forth across the substrate) during the printing process. Preferably the LED source is positioned so that the LED source moves with the printhead during ink-jet printing. For example, the printhead and LED source may be attached to a printer carriage or shuttle which is capable of moving across the substrate. In this preferred embodiment the ink is exposed to the UV radiation emitted from the LED source shortly after the ink has been ejected onto the substrate. Alternatively, the LED source may be arranged such that the ink drops ejected from the printhead are subject to almost instantaneous partial cure, such that they are "fixed" as they fall onto the substrate.

Although multiple LED sources may be used according to the invention, the printing apparatus used in the method of the invention is preferably an ink-jet printer comprising one LED source that is positioned adjacent to the printhead, or two LED sources that are located on either side of the printhead carriage. The printhead moves relative to the substrate although either the printhead or the substrate may move while the other remains static. Preferably the printhead moves and the substrate is static.

The flash lamp may also be positioned such that it moves with the printhead during ink-jet printing but this is not preferred, as this arrangement would require a high flash frequency. The flash lamp is preferably static and positioned downstream of the printhead. More than one flash lamp may be used.

DETAILED DESCRIPTION OF THE INVENTION

FIG. 1 shows part of an ink-jet printer according to a preferred embodiment of the present invention. The printer 1 comprises LED sources 3a and 3b located on either side of printhead 5. The printhead 5 and LED sources 3a, 3b are provided on a printer carriage (not shown) that is able to move back and forth along axis x. The printer is provided with two flash lamps 7a and 7b. A substrate 9 is provided on a supply roll 11 and collected on a collection roll 13. In use, the printer carriage moves back and forth across the width of the substrate along axis x as ink is ejected from nozzles in printhead 5 onto substrate 9. Ink that has been deposited onto substrate 9 is partially cured by exposure to UV radiation that is emitted from LED source 3a and/or 3b. Once the ink has been partially cured, the substrate is moved away from supply roll 11 and towards collection roll 13 in direction y, which is perpendicular to axis x along which the printer carriage moves. The partially cured ink is then exposed to UV radiation emitted from flash lamps 7a and 7b before the substrate is collected on collection roll 13.

The UV-curable ink used in the method of the present invention comprises a UV-curable monomer or oligomer or a mixture thereof; a photoinitiator and a colourant.

The ink is preferably an ink-jet ink.

A wide range of UV-curable monomers and oligomers are known in the art and would be suitable for use in the inks of the invention.

The ink of the present invention preferably cures by radical polymerisation and the ink comprises a monomer or oligomer that is polymerizable by radical addition polymerisation, or a mixture thereof.

The ink preferably includes a (meth)acrylate monomer. The (meth)acrylate monomer may be a monofunctional monomer, a multifunctional monomer or combinations thereof.

Monofunctional (meth)acrylate monomers are well known in the art and are preferably the esters of acrylic acid. Preferred examples include phenoxyethyl acrylate (PEA), cyclic TMP formal acrylate (CTFA), isobornyl acrylate (IBOA), tetrahydrofurfuryl acrylate (THFA), 2-(2-ethoxyethoxy) ethyl acrylate, octadecyl acrylate (ODA), tridecyl acrylate (TDA), isodecyl acrylate (IDA) and lauryl acrylate. PEA is particularly preferred.

Monofunctional (meth)acrylate monomers may be included at 1-90% by weight, preferably 10-80% by weight, more preferably 20-60% by weight, most preferably 30-50% by weight, based on the total weight of the ink.

Suitable multifunctional (meth)acrylate monomers typically have a viscosity of less than 20 mPas at 25° C. and a molecular weight of less than 450. Di-, tri- and tetra-functional monomers are preferred. Examples of the multifunctional acrylate monomers that may be included in the ink-jet inks include hexanediol diacrylate, trimethylolpropane triacrylate, pentaerythritol triacrylate, polyethyleneglycol diacrylate (for example tetraethyleneglycol diacrylate), dipropyleneglycol diacrylate, tri(propylene glycol) triacrylate, neopentylglycol diacrylate, bis(pentaerythritol) hexaacrylate, and the acrylate esters of ethoxylated or propoxylated glycols and polyols, for example, propoxylated neopentyl glycol diacrylate, ethoxylated trimethylolpropane triacrylate, and mixtures thereof. Particularly preferred are di- and trifunctional acrylates. Also preferred are those with a molecular weight greater than 200.

In addition, suitable multifunctional acrylate monomers include esters of methacrylic acid (i.e. methacrylates), such as hexanediol dimethacrylate, trimethylolpropane trimethacrylate, triethyleneglycol dimethacrylate, diethyleneglycol dimethacrylate, ethyleneglycol dimethacrylate, 1,4-butanediol dimethacrylate. Mixtures of (meth)acrylates may also be used.

Multifunctional (meth)acrylate monomers may be included in an amount of 1-90% by weight, preferably 2-30% by weight, more preferably 5-20%, based on the total weight of the ink.

(Meth)acrylate is intended herein to have its standard meaning, i.e. acrylate and/or methacrylate. Mono and multifunctional are also intended to have their standard meanings, i.e. one and two or more groups, respectively, which take part in the polymerisation reaction on curing.

The inks of the preferred embodiment may also contain α,β-unsaturated ether monomers, such as vinyl ethers. These monomers are known in the art and may be used to reduce the viscosity of the ink formulation. Typical vinyl ether monomers which may be used in the inks of the present invention are triethylene glycol divinyl ether, diethylene glycol divinyl ether, 1,4-cyclohexanedimethanol divinyl ether and ethylene glycol monovinyl ether. Mixtures of vinyl ether monomers may be used. When present in the inks of the invention, the vinyl ether monomer is preferably present in an amount of 1-20% by weight, more preferably 7-15% by weight, based on the total weight of the ink. In a preferred embodiment, the ratio of acrylate monomer to vinyl ether monomer is from 4:1 and 15:1. See WO 02/061001 for further details of formulations containing α,β-unsaturated ether monomers in combination with acrylate monomers.

N-vinyl amides and N-(meth)acryloyl amines may also be used in the inks of the invention. N-vinyl amides are well-known monomers in the art and a detailed description is therefore not required. N-vinyl amides have a vinyl group attached to the nitrogen atom of an amide which may be further substituted in an analogous manner to the (meth)acrylate monomers. Preferred examples are N-vinyl caprolactam (NVC) and N-vinyl pyrrolidone (NVP). Similarly, N-acryloyl amines are also well-known in the art. N-acryloyl amines also have a vinyl group attached to an amide but via the carbonyl carbon atom and again may be further substituted in an analogous manner to the (meth)acrylate monomers. Regarding the nomenclature, since the term "acryloyl"

incorporates a carbonyl group, the amide is actually named as an amine. A preferred example is N-acryloylmorpholine (ACMO).

N-vinyl amides and/or N-acryloyl amines may be included at 3-50% by weight, preferably 5-40% by weight, more preferably 10-30% by weight, based on the total weight of the ink. NVC is particularly preferred.

The inks may include a UV-curable oligomer. By "UV curable oligomer" is meant an oligomer that includes a polymerizable group and is therefore capable of taking part in the curing reaction. The oligomer preferably has a molecular weight of 450 to 4,000, more preferably from 450 to 2,000 and most preferably from 450 to 1500. The degree of functionality of the oligomer determines the degree of crosslinking and hence the properties of the cured ink. The oligomer is preferably multifunctional meaning that it contains on average more than one reactive functional group per molecule. The average degree of functionality is preferably from 2 to 6, most preferably 2. UV-curable oligomers of this type are well known in the art. The oligomer is preferably based on bisphenol A, a polyester, a polyether, an amine-modified polyester, an amine-modified polyethers or a urethane. Particularly preferred oligomers include one or more (meth)acrylate polymerizable groups.

Oligomers may be included at 1-30% by weight, preferably 2-20% by weight and more preferably 3-15% by weight, based on the total weight of the ink.

In a particularly preferred embodiment, the ink comprises a monofunctional (meth)acrylate monomer, such as those described hereinabove; an N-vinyl amide and/or an N-(meth)acryloyl amine, such as those described hereinabove; at least one multifunctional (meth)acrylate such as those described hereinabove; and a UV curable oligomer, such as those described hereinabove. Most preferably the ink comprises monofunctional acrylate monomer, an N-vinyl amide, at least one multifunctional acrylate and a UV curable oligomer.

Preferred monomer combinations are THFA/NVC, IBOA/NVC, PEA/NVC, CTFA/NVC, IBOA/ACMO and IBOA/NVP; together with at least one multifunctional acrylate monomer, preferably ethoxylated trimethylolpropane triacrylate, propoxylated neopentyl glycol diacrylate or a mixture thereof. A particularly preferred example includes phenoxyethyl acrylate, NVC and at least one multifunctional acrylate monomer; most preferably phenoxyethyl acrylate, NVC and ethoxylated trimethylolpropane triacrylate and/or propoxylated neopentyl glycol diacrylate.

The ink used in the method of the present invention also includes a colouring agent, which may be either dissolved or dispersed in the liquid medium of the ink. The colouring agent can be any of a wide range of suitable colouring agents that would be known to the person skilled in the art. Preferably the colouring agent is a dispersible pigment, of the types known in the art and commercially available such as, for example, under the trade-names Paliotol (available from BASF plc), Cinquasia, Irgalite (both available from Ciba Speciality Chemicals) and Hostaperm (available from Clariant UK). The pigment may be of any desired colour such as, for example, Pigment Yellow 13, Pigment Yellow 83, Pigment Red 9, Pigment Red 184, Pigment Blue 15:3, Pigment Green 7, Pigment Violet 19, Pigment Black 7. Especially useful are black and the colours required for trichromatic process printing. Mixtures of pigments may be used.

The total proportion of pigment present is preferably from 0.5 to 15% by weight, more preferably from 1 to 5% by weight, based on the total weight of the ink.

The ink also includes a photoinitiator, which, under irradiation by UV light, initiates the polymerisation of the curable material. Preferred are photoinitiators which produce free radicals on irradiation (free radical photoinitiators) such as, for example, benzophenone, 1-hydroxycyclohexyl phenyl ketone, 2-benzyl-2-dimethylamino-(4-morpholinophenyl) butan-1-one, benzil dimethylketal, bis(2,6-dimethylbenzoyl)-2,4,4-trimethylpentylphosphine oxide or mixtures thereof. Such photoinitiators are known and commercially available such as, for example, under the trade names Irgacure, Darocur (from Ciba) and Lucerin (from BASF).

Single photoinitiators can be used but systems based on a mixture of different photoinitiators are preferred.

The method of the invention cures the ink in two stages: the partial cure step causes the ink to adhere to the substrate and prevents dot spread, and the second curing step provides surface cure. Partial cure is achieved by exposure to UV radiation generated by an LED source and the second cure step is achieved by exposure to a flash lamp. The inks of the present invention therefore preferably include a photoinitiator system that is specifically tailored to respond to the UV output of the LED source and the UV output of the flash lamp, which ensures a good balance between through cure and surface cure in the cured ink film.

The narrow spectral range of LED sources means that the tuning of the photoinitiator system can be more important than with broader output sources such as medium pressure mercury lamps. The majority of commercially available initiators are designed to absorb at the main lines of the mercury spectrum. The broader emission maxima peaks of the spectrum make it far easier to overlap the absorption of the initiator. In comparison the output from LED sources is centred on a very narrow band around the maxima (typically 15 nm wide). This means the energy to cure the inks has to be collected over a very narrow wavelength window and it is therefore preferable that the efficiency of the absorption is maximised. In order to maximise absorption, blends of photoinitiators are preferably used. The photoinitiators are tailored to the wavelength of the LED source used.

In one embodiment of the invention partial cure is achieved by exposure to an LED source that emits peak UV radiation at 365 nm. Photoinitiators suitable for use in this embodiment are selected from Norrish type I and Norrish type II photoinitiators. A Norrish type I radical photoinitiator is photoinitiator that undergoes the Norrish type I reaction when exposed to actinic radiation and a Norrish type II radical photoinitiator is photoinitiator that undergoes the Norrish type II reaction when exposed to actinic radiation. The Norrish type I reaction is defined by IUPAC as α-cleavage of an excited carbonyl compound leading to an acyl-alkyl radical pair (from an acyclic carbonyl compound) or an acyl-alkyl biradical (from a cyclic carbonyl compound) as a primary photoproduct. The Norrish type II reaction is defined by IUPAC as the photochemical abstraction of a γ-hydrogen by an excited carbonyl compound to produce a 1,4-biradical as a primary photoproduct. Non limiting examples of suitable initiators are:

Type I: 2-Methyl-1[4-(methylthio)phenyl]-2-morpholino-propan-1-one (Irgacure 907), 2-Benzyl-2-dimethylamino-1-(4-morpholinophenyl)-butanone-1 (Irgacure 369), 2-(dimethylamino)-2-[(4-methylphenyemethyl]-1-[4-(4-morpholinyl)phenyl]-1-butanone, (Irgacure 379).

Type H Isopropyl thioxanthone, diethyl thioxanthone, 2-chlorothioxanthone.

In the case of the type II initiators, addition of a suitable co-initiator may be required. Typically this is an amine, an example being 2-dimethylamino-ethylbenzoate.

In an alternative embodiment of the invention partial cure is achieved by exposure to an LED source that emits UV radiation at 395 or 400 nm. Photoinitiators suitable for use in this embodiment include bis(2,6-dimethylbenzoyl)-2,4,4-trimethylpentylphosphine oxide, 2,4,6-trimethylbenzoyl-diphenylphosphine oxide, ethyl(2,4,6-trimethylbenzoyl)-phenylphosphinate, bis(2,4,6-trimethylbenzoyl)-phenylphosphine oxide and isopropyl thioxanthone.

In an alternative embodiment of the invention partial cure is achieved by exposure to an LED source that emits UV radiation at 405 nm. Photoinitiators suitable for use in this embodiment include Norrish type I and Norrish type II photoinitiators selected from:

Type I Bis(2,6-dimethylbenzoyl)-2,4,4-trimethylpentylphosphine oxide

Type II Camphorquinone, 1-phenyl-1,2-propanedione.

As before, in the case of the type II initiators, addition of a suitable co-initiator may be required such as 2-dimethylamino-ethylbenzoate.

The spectral output of the xenon flash lamp is rather broad, running from 300 nm and through the visible range. Photoinitiators that respond to wavelengths above 300 nm are therefore suitable for responding to UV radiation emitted from the xenon flash lamp. Non limiting examples include Irgacure 369, Irgacure 379, bis(2,6 dimethylbenzoyl)-2,4,4-trimethylpentylphosphine oxide, 2,4,6-trimethylbenzoyl-diphenylphosphine oxide, ethyl(2,4,6-trimethylbenzoyl)-phenylphosphinate and 1-[4-(2-hydroxyethoxy)-phenyl]-2-hydroxy-2-methyl-1-propane-1-one (Irgacure 2959).

Preferred inks of the invention comprise a UV-curable monomer or oligomer or a mixture thereof, a colourant and a photoinitiator system selected from one of the following:

a) one or more of 2-methyl-1[4-(methylthio)phenyl]-2-morpholinopropan-1-one, 2-benzyl-2-dimethylamino-1-(4-morpholinophenyl)-butanone-1,2-(dimethylamino)-2-[(4-methylphenyl)methyl]-1-[4-(4-morpholinyl)phenyl]-1 butanone, isopropyl thioxanthone, diethyl thioxanthone or 2-chlorothioxanthone; and one of bis(2,6-dimethylbenzoyl)-2,4,4 trimethylpentylphosphine oxide, 2,4,6-trimethylbenzoyl-diphenylphosphine oxide, ethyl(2,4,6-trimethylbenzoyl)-phenylphosphinate or 1-[4-(2-hydroxyethoxy)-phenyl]-2-hydroxy-2-methyl-1-propane-1-one;

b) one or more of bis(2,6-dimethylbenzoyl)-2,4,4-trimethylpentylphosphine oxide, 2,4,6-trimethylbenzoyl-diphenylphosphine oxide, ethyl(2,4,6-trimethylbenzoyl)-phenylphosphinate, bis(2,4,6-trimethylbenzoyl)-phenylphosphine oxide or isopropyl thioxanthone; and 1-[4-(2-hydroxyethoxy)-phenyl]-2-hydroxy-2-methyl-1-propane-1-one; or c) one or more of bis(2,6-dimethylbenzoyl)-2,4,4-trimethylpentylphosphine oxide, camphorquinone or 1-phenyl-1,2-propanedione; and 1-[4-(2-hydroxyethoxy)-phenyl]-2-hydroxy-2-methyl-1-propane-1-one.

Particularly preferred inks of the invention comprise a UV-curable monomer or oligomer or a mixture thereof, a colourant and a photoinitiator mixture selected from one of the following:

a) one or more of 2-methyl-1[4-(methylthio)phenyl]-2-morpholinopropan-1-one, 2-benzyl-2-dimethylamino-1-(4-morpholinophenyl)-butanone-1, or 2-(dimethylamino)-2-[(4-methylphenyl)methyl]-1-[4-(4-morpholinyl)phenyl]-1 butanone; and 1-[4-(2-hydroxyethoxy)-phenyl]-2-hydroxy-2-methyl-1-propane-1-one;

b) one or more of bis(2,4,6-trimethylbenzoyl)-phenylphosphine oxide or isopropyl thioxanthone; and 1-[4-(2-hydroxyethoxy)-phenyl]-2-hydroxy-2-methyl-1-propane-1-one; or c) one or more of bis(2,6-dimethylbenzoyl)-2,4,4-trimethylpentylphosphine oxide, camphorquinone or 1-phenyl-1,2-propanedione; and 1-[4-(2-hydroxyethoxy)-phenyl]-2-hydroxy-2-methyl-1-propane-1-one The photoinitiator systems listed under a) above are tailored for use with a 365 nm LED source and a xenon flash lamp, the systems under b) are tailored for use with a 395 nm or 400 nm LED source and a xenon flash lamp and the systems under c) are tailored for use with a 405 nm LED source and a xenon flash lamp.

A particularly preferred ink of the present invention comprises a UV-curable monomer or oligomer or a mixture thereof, a colourant, bis(2,4,6-trimethylbenzoyl)-phenylphosphine oxide, isopropyl thioxanthone and 1-[4-(2-hydroxyethoxy)-phenyl]-2-hydroxy-2-methyl-1-propane-1-one and is tailored for use with a 395 nm or 400 nm LED source and a xenon flash lamp.

The inks of the present invention dry primarily by curing, i.e. by the polymerisation of the monomers present, as discussed hereinabove, and hence are curable inks. Such inks do not, therefore, require the presence of water or a volatile organic solvent to effect drying of the ink, although the presence of such components may be tolerated. Therefore, the inks of the present invention are preferably substantially free of water and volatile organic solvents. However, trace amounts of volatile organic solvents present, for example, as part of commercially available pigment dispersions, or trace amounts of water inevitably present by absorption from the air may be tolerated in the ink provided they do not adversely affect the cure speed.

Other components of types known in the art may be present in the ink to improve the properties or performance. These components may be, for example, surfactants, defoamers, dispersants, synergists for the photoinitiator, stabilisers against deterioration by heat or light, reodorants, flow or slip aids, biocides and identifying tracers.

The ink is particularly suited to piezoelectric drop-on-demand ink-jet printing. Suitable substrates include styrene, PolyCarb (a polycarbonate), BannerPVC (a PVC) and VIVAK (a polyethylene terephthalate glycol modified). The inks are preferably suitable for application by ink-jet printing.

The present invention provides a printing apparatus that is adapted for use in the method of the invention and inks that are adapted for use in the method of the present invention. The features of the printing apparatus and the ink of the present invention are described in the above discussion.

Ink-jet inks of the invention exhibit a desirable low viscosity, i.e. 100 mPas or less, preferably 50 mPas or less and most preferably 25 mPas or less at 25° C. (although when ejected through the nozzles, the jetting temperature is often elevated to about 40° C.). Viscosity may be measured using a Brookfield viscometer fitted with a thermostatically controlled cup and spindle arrangement, such as model LDV1+ with the ULA spindle and cup arrangement at 25° C. and spindle speed of 20 rpm.

The present invention further provides a set of ink-jet inks wherein one or more of the inks in the set is an ink-jet ink of the present invention. Preferably all of the inks in the ink-jet ink set are inks of the present invention. The present invention also provides a cartridge containing the ink-jet ink as defined herein. The cartridges comprise an ink container and an ink delivery port which is suitable for connection with an ink-jet printer.

The present invention also provides a substrate having an ink of the present invention printed thereon.

The inks of the invention may be prepared by known methods such as, for example, stirring with a high-speed water-cooled stirrer, or milling on a horizontal bead-mill.

EXAMPLES

Example 1

Cyan, yellow, magenta and black ink-jet ink formulations having the following compositions were prepared by mixing the components in the given amounts (percentages are given by weight and are based on the total weight of the ink).

TABLE 1

| Components | Cyan | Yellow | Magenta | Black |
|---|---|---|---|---|
| 2 Phenoxy ethyl acrylate | 43.94 | 43.02 | 42.43 | 43.6 |
| N-vinyl caprolactam | 24.59 | 23.34 | 26.99 | 24.75 |
| Ethoxylated(3) trimethylol propane tracrylate | 7.49 | 7.21 | 6.95 | 7.42 |
| UV stabilizer ST1 | 0.3 | 0.4 | 0.2 | 0.3 |
| Propoxylated neopentyl glycol diacrylate | 4.0 | 8.0 | — | 3.0 |
| Sartomer CN964 A85 (urethane acrylate oligomer) | 4.0 | 4.0 | — | — |
| Sartomer PRO 20169 (urethane acrylate oligomer) | — | — | — | 6.6 |
| Cyan pigment dispersion | 8.65 | — | — | — |
| Yellow pigment dispersion | — | 7.0 | — | — |
| Magenta pigment dispersion | — | — | 16.40 | — |
| Black pigment dispersion | — | — | — | 6.3 |
| Irgacure 819 | 4.0 | 4.0 | 4.0 | 4.0 |
| Irgacure 2959 | 2.0 | 2.0 | 2.0 | 2.0 |
| Isopropyl thioxanthone | 1.0 | 1.0 | 1.0 | 2.0 |
| Byk 307 (surfactant) | 0.03 | 0.03 | 0.03 | 0.03 |

Evaluation

The inks were drawn down on to 220 micron gloss PVC substrate using a no. 2 Kbar, depositing a 12 micron wet film. The ink films were then partially cured using a 4 W/cm$^2$ Phoseon RX Starfire Max 150 395 nm LED fitted to a Fusion UV systems inc DVS99 OGE conveyorised drier. The spacing between the LED and the substrate was set at 6 mm. The conventional mercury lamp on the drier was switched off and the belt speed was set to 15 meters per minute. Each film was partially cured to the point where the ink film had just attained adhesion to the substrate (assessed by to scratch resistance). The degree of cure was controlled by varying the percentage power throughput of the LED device from 0% to 100% in 5% increments. The partially cured prints were then placed under a xenon flash lamp and the number of flashes required to reach a tack free film determined (assessed by pressing a finger into the ink surface). The results are shown in Table 2.

TABLE 2

| Ink sample | LED percentage power required to give adhesion[1] at 15 m/min | Number of flashes of xenon lamp required for tack free film |
|---|---|---|
| Cyan | 20% | 2 |
| Magenta | 20% | 2 |
| Yellow | 40% | 2 |
| Black | 45% | 2 |

[1]Adhesion is defined here as a value of 4 in the finger-nail scratch test described herein above.

The cyan ink described above was drawn down as before and cured solely with the xenon flash lamp (3 flashes). The ink film was surface dry but had poor scratch adhesion to the substrate. The partially cured film was then cured using the LED source described above with the belt speed set to 15 meters per minute and an LED power throughput of 20%. Following exposure the adhesion was reassessed. The film was found to have excellent scratch resistance confirming that the LED source is key in achieving through cure and adhesion and the xenon flash is required to achieve surface cure.

Example 2

Table 3 shows the composition of the black ink provided in Example 1, and a second black ink in which the photoinitiator system has been changed (percentages are given by weight and are based on the total weight of the ink).

TABLE 3

| Components | Black Example 1 | Black Example 2 |
|---|---|---|
| 2 Phenoxy ethyl acrylate | 43.6 | 44.6 |
| N Vinyl caprolactam | 24.75 | 24.75 |
| Ethoxylated(3) trimethylol propane tracrylate | 7.42 | 7.42 |
| UV stabilizer ST1 | 0.3 | 0.3 |
| Propoxylated neopentyl glycol acrylate | 3.0 | 3.0 |
| Sartomer PRO 20169 | 6.6 | 6.6 |
| Black pigment dispersion | 6.3 | 6.3 |
| Irgacure 819 | 4.0 | 4.0 |
| Irgacure 2959 | 2.0 | 2.0 |
| Isopropyl thioxanthone | 2.0 | — |
| Irgacure 369 | — | 1.0 |
| Byk 307 | 0.03 | 0.03 |

The inks were drawn down on to 220 micron gloss PVC using a no 2 Kbar (12 micron). The cure was assessed on a conveyorised drier fitted with one 80 W/cm medium pressure mercury lamp. The UV dose required to achieve through cure and surface cure was noted. The degree of surface cure was assessed by pressing the surface of the ink with a finger and through cure was assessed by scratching with a finger nail. Full surface cure produced a film with no surface tackiness and full through cure produced a film that could not be removed with a finger nail. The inks were also assessed on an LED curing rig comprising a 4 W/cm$^2$ Phoseon RX Starfire Max 150 395 nm LED source fitted to a Fusion UV systems inc DVS99 OGE conveyorised drier. The spacing between the LED and the ink was set at 6 mm. The conventional mercury lamp on the drier was switched off and the belt speed set to 15 meters per minute. The percentage LED power required to achieve through cure was noted. The results are shown in Table 3.

TABLE 3

| | LED cure | | Mercury lamp cure | |
|---|---|---|---|---|
| Composition | LED % power required for through cure | UV dose required for through cure/ mJ/cm$^2$ | UV dose required for surface cure/ mJ/cm$^2$ | UV dose required for through cure/ mJ/cm$^2$ |
| Black Example 1 | 45 | 162 | 74 | 84 |
| Black Example 2 | 80 | 285 | 70 | 74 |

As can be seen from the above results, the ink of Example 1 has higher cure efficiency under the LED lamp, only requiring 162 mJ/cm$^2$ to achieve through cure compared to 285 mJ/cm$^2$ for Example 2. When dried by a mercury lamp however, only minimal differences in cure efficiency are seen. In fact, composition 1 was found to be slightly less efficient.

The above results demonstrate that careful selection of photoinitiator enables absorption of the UV from an LED source to be maximised, which improves the efficiency of the LED curing step.

What is claimed is:

1. A method comprising:
   applying a UV-curable ink to a substrate;
   partially curing the ink by exposing the ink to UV radiation from an LED source; and
   exposing the partially cured ink to UV radiation from a flash lamp, wherein said UV-curable link cures by free radical polymerization.

2. The method of claim 1 wherein the flash lamp is a xenon or krypton flash lamp.

3. The method of claim 1 wherein the LED source emits peak radiation between 250 and 450 nm.

4. The method of claim 1 wherein the UV dose provided to the ink during the partial cure step is 10 to 300 mJ/cm$^2$.

5. The method of claim 1 wherein the LED source emits UV radiation at 90% or less of the maximum power output.

6. The method of claim 1 wherein the ink is an ink-jet ink that is applied to the substrate using an ink-jet printer.

7. The method of claim 1 wherein no inert environment is provided during the curing steps.

8. The method of claim 1 wherein the UV-curable ink comprises a UV-curable monomer or oligomer or a mixture thereof; a photoinitiator and a colorant.

9. The method of claim 8 wherein the UV-curable ink is an ink-jet ink.

10. The method of claim 8 wherein the ink comprises a monofunctional (meth)acrylate monomer, a multifunctional (meth)acrylate monomer or a combination thereof.

11. The method of claim 10 wherein the ink comprises 1-90% by weight of said monofunctional (meth)acrylate monomer, based on the total weight of the ink.

12. The method of claim 10 wherein the ink comprises 1-90% by weight of said multifunctional (meth)acrylate monomer, based on the total weight of the ink.

13. The method of claim 8 wherein the ink comprises an N-vinyl amide and/or an N-acryloyl amine.

14. The method of claim 13 wherein the ink comprises 3-50% by weight of said N-vinyl amide and/or said N-acryloyl amine, based on the total weight of the ink.

15. The method of claim 8 wherein the ink comprises 1-30% by weight of oligomer, based on the total weight of the ink.

16. The method of claim 8 wherein the ink comprises a monofunctional (meth)acrylate monomer, an N-vinyl amide and/or an N(meth)acryloyl amine, at least one multifunctional (meth)acrylate and a UV curable oligomer.

17. The method of claim 8 wherein the ink comprises THFA/NVC, IBOA/NVC, PEA/NVC, CTFA/NVC, IBOA/ACMO or IBOA/NVP; together with at least one multifunctional acrylate monomer.

18. The method of claim 8 wherein the ink comprises phenoxyethyl acrylate, NVC and at least one multifunctional acrylate monomer.

19. The method of claim 8 wherein the photoinitiator produces free radicals on irradiation with UV.

20. The method of claim 8 wherein the photoinitiator is selected from one or more of: 2-methyl-1[4-(methylthio)phenyl]-2-morpholinopropan-1-one (Irgacure 907), 2-benzyl-2-dimethylamino-1-(4-morpholinophenyl)-butanone-1 (Irgacure 369), 2-(dimethylamino)-2-[(4-methylphenyl)methyl]-1-[4-(4-morpholinyl)phenyl]-1 butanone; (Irgacure 379), isopropyl thioxanthone, diethyl thioxanthone, 2-chlorothioxanthone, bis(2,6-dimethylbenzoyl)-2,4,4-trimethylpentylphosphine oxide, 2,4,6-trimethylbenzoyl-diphenylphosphine oxide, ethyl(2,4,6-trimethylbenzoyl)-phenylphosphinate, bis(2,4,6-trimethylbenzoyl)-phenylphosphine oxide, camphorquinone, 1-phenyl-1,2-propanedione and 1-[4-(2-hydroxyethoxy)-phenyl]-2-hydroxy-2-methyl-1-propane-1-one (Irgacure 2959).

21. The method of claim 8 wherein the photoinitiator comprises one or more of 2-methyl-1[4-(methylthio)phenyl]-2-morpholinopropan-1-one, 2-benzyl-2-dimethylamino-1-(4-morpholinophenyl)-butanone-1,2-(dimethylamino)-2-[(4-methylphenyl)methyl]-1-[4-(4-morpholinyl)phenyl]-1 butanone, isopropyl thioxanthone, diethyl thioxanthone or 2-chlorothioxanthone; and
   one of bis(2,6-dimethylbenzoyl)-2,4,4 trimethylpentylphosphine oxide, 2,4,6-trimethylbenzoyl-diphenylphosphine oxide, ethyl(2,4,6-trimethylbenzoyl)-phenylphosphinate or 1-[4-(2-hydroxyethoxy)-phenyl]-2-hydroxy-2-methyl-l-propane-l-one;
   and wherein the peak in the wavelength distribution of the LED source is 365 nm.

22. The method of claim 8 wherein the photoinitiator comprises one or more of bis(2,6-dimethylbenzoyl)-2,4,4-trimethylpentylphosphine oxide, 2,4,6-trimethylbenzoyl-diphenylphosphine oxide, ethyl(2,4,6-trimethylbenzoyl)-phenylphosphinate, bis(2,4,6-trimethylbenzoyl)-phenylphosphine oxide or isopropyl thioxanthone; and
   1-[4-(2-hydroxyethoxy)-phenyl]-2-hydroxy-2-methyl-1-propane-1-one;
   and wherein the peak in the wavelength distribution of the LED source is 395 nm or 400 nm.

23. The method of claim 8 wherein the photoinitiator comprises one or more of bis(2,6-dimethylbenzoyl)-2,4,4-trimethylpentylphosphine oxide, camphorquinone or 1-phenyl-1,2-propanedione; and
   1-[4-(2-hydroxyethoxy)-phenyl]-2-hydroxy-2-methyl-1-propane-1-one;
   and wherein the peak in the wavelength distribution of the LED source is 405 nm.

24. The method of claim 8 wherein the photoinitiator comprises bis(2,4,6-trimethylbenzoyl)-phenylphosphine oxide, isopropyl thioxanthone and 1-[4-(2-hydroxyethoxy)-phenyl]-2-hydroxy-2-methyl-1-propane-l-one and the peak in the wavelength distribution of the LED source is 395 nm or 400 nm.

25. A printing apparatus comprising:
   means for applying a UV-curable ink to a substrate;
   an LED source that is capable of emitting UV radiation and partially curing the ink; and
   a flash lamp that emits UV radiation, wherein said UV-curable link cures by free radical polymerization.

26. The printing apparatus of claim 25 wherein the flash lamp is a xenon or krypton flash lamp.

27. The printing apparatus of claim 26 wherein the flash lamp is positioned such that ink that has been applied to the substrate is exposed to UV radiation from the flash lamp after it has been exposed to UV radiation from the LED source.

28. The printing apparatus of claim 26 wherein the means for applying a UV-curable ink to a substrate is an ink-jet printer.

29. The printing apparatus of claim 28 wherein the ink-jet printer comprises a printhead and the LED source is positioned so that the LED source moves with the printhead during ink-jet printing.

30. The printing apparatus of claim 28 wherein the printhead and LED source are positioned on a printer carriage that is capable of moving across the substrate during printing.

31. The printing apparatus of claim 29 comprising one LED source that is positioned adjacent to the printhead, or two LED sources that are located on either side of the printhead.

32. The printing apparatus of claim 29 wherein the flash lamp is static and is positioned downstream of the printhead.

33. The printing apparatus of claim 26 comprising two or more flash lamps.

* * * * *